June 17, 1958     E. J. RENNER     2,839,181
MOVABLE TUBULAR CONVEYOR BELT
Filed Dec. 31, 1954
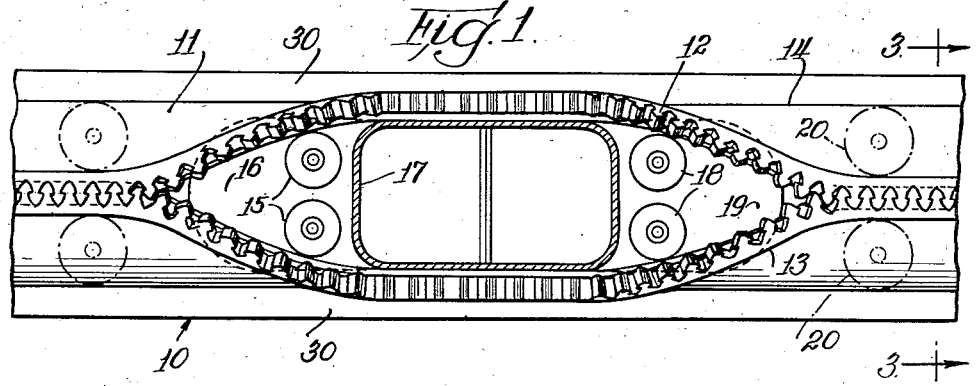
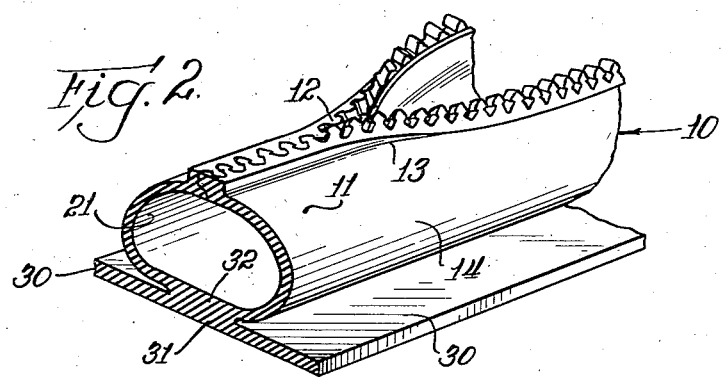
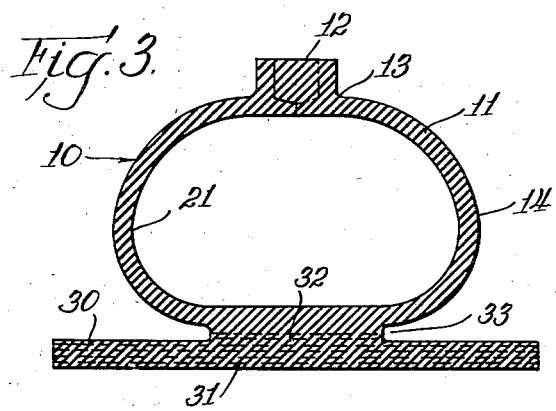
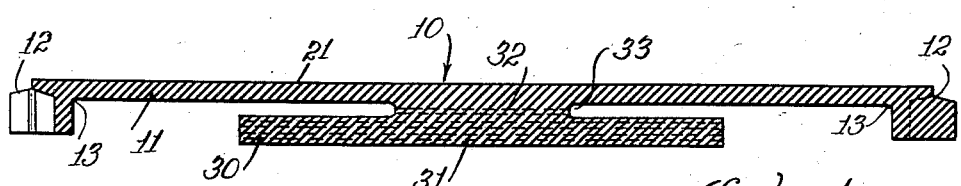
Inventor:
Elmer J. Renner
By:- Mann, Brown and Hansmann
Attys.

United States Patent Office 2,839,181
Patented June 17, 1958

2,839,181

MOVABLE TUBULAR CONVEYOR BELT

Elmer J. Renner, Aurora, Ill., assignor to Stephens-Adamson Mfg. Co., a corporation of Illinois Application December 31, 1954, Serial No. 479,164

2 Claims. (Cl. 198—201)

This invention relates to a movable tubular conveyor belt.

The conveyor belt of this invention constitutes an improvement over the types of belts shown in the United States Patents Nos. 2,365,762 and 2,548,111 granted to Johns et al., and may be used with any conveying apparatus of the general type shown in these patents.

*Invention summarized.*—The movable tubular conveyor belt of this invention comprises a flexible tube having interlocking means (such as a "zipper" device) along its entire length, the interlocking means being adapted to be opened for any given section of the belt as that portion of the moving belt approaches a charging or discharging station, and to be closed again after that portion of the tube passes beyond the station. An important feature of the tube is that its inner surface is substantially smooth in transverse cross section.

For most convenient use, the tube has a base member with flanges extending on both sides which cooperate with supporting and guiding devices. For greatest strength, the tubular portion of the conveyor belt is integrally formed. In the preferred embodiment, the interior of the tube presents a substantially smooth surface in all directions and is adapted to assume a substantially flat shape when the tube is opened up and spread out to its full extent.

*Advantages of this invention.*—The various features of this invention provide several important advantages. As it presents a smooth surface across from one edge of the tube to the other, the interior of this conveyor belt tends to remain relatively clean, and in addition is easily subjected to whatever periodic cleansing operation may be required to remove any material that might accumulate. The feature of forming the conveyor belt wall so that the inner surface of the belt assumes a flat shape when the belt is spread out also makes for easy, convenient cleaning, as well as rendering the discharge of materials from the conveyor belt more effective.

Integral construction of the tubular portion of the conveyor belt produces a strong, durable belt whose side walls may be repeatedly flexed for spreading the belt out without deterioration of any part of the tube wall. In addition, the integral construction makes the manufacturing problem of matching the complementary interlocking means on opposing side walls of the tube an easy one. Due to its simple construction, the conveyor belt can be fabricated very economically.

*Drawings.*—The invention will be described by reference to the embodiment shown in the accompanying drawings. In the drawings:

Figure 1 is a fragmentary plan view of the movable tubular conveyor belt of this invention in use;

Figure 2 is a fragmentary perspective view of the same embodiment of the conveyor belt of this invention;

Figure 3 is a sectional view taken along 3—3 of Figure 1; and

Figure 4 is a view showing a cross section of the conveyor belt with the tube opened up and spread out.

*Conveying apparatus in which this invention is useable.*—Figure 1 shows in plan view a portion of one embodiment of the movable tubular conveyor belt of this invention as it may be used in conveying apparatus of the type shown in U. S. Patent No. 2,365,762, issued to Henry S. Johns and William H. Johns on December 26, 1944. Figure 4 of that patent gives an idea of the general type of apparatus in which this conveyor belt is useful.

In Figure 1 of the present specification, a section of continuous conveyor belt 10 is shown at a charging station in the conveying apparatus similar to the station shown at the bottom of Figure 4 of the Johns patent. Tubular portion 11 of the belt is provided with interlocking means 12, which in the embodiment shown are so-called "zipper" teeth, at the outer edge 13 of each of its side walls 14. As shown, the interlocking means fit snugly together at all positions other than at the charging station. Successive portions of continuous conveyor belt 10 move up to the charging station, where they are opened up to receive the material to be conveyed, and closed again as they move on from the station.

In Figure 1, zipper teeth 12 for a given section of the conveyor belt are shown as being spread apart and that portion of tube 11 opened up by outward pressure of guide wheels 15 exerted against the inner surface of side walls 14 of the tube as the teeth approach the charging station from the left. Guide wheels 15 are mounted inside tube 11 on skirt 16 which extends lengthwise from hopper 17 toward the direction from which the continuously moving conveyor belt approaches the charging station. Side walls 14 are extended by guide wheels 15 to a point where they pass easily around hopper 17 (shown in section in Figure 1), by means of which the successive portions of the conveyor belt are filled.

Guide wheels 18 mounted on hopper skirt 19 on the remote side of hopper 17 help to keep teeth 12 spaced away from the hopper and to align them properly for the interlocking engagement into which they move as they approach guide wheels 20 farther along the path of conveyor belt 10. Guide wheels 20 (shown in dotted line in Figure 1) are mounted outside tube 11 in position to press zipper teeth 12 into snug interlocking engagement so that the conveyor belt remains closed during the rest of its passage through the conveying apparatus until it reaches the appropriate discharge point, such as that shown at the top of Figure 4 of the Johns patent.

*Tubular portion of conveyor belt.*—Tubular portion 11 of conveyor belt 10 is a flexible tube formed of a relatively elastic material. The material must be both compressible and expansible in order to permit the necessary changes in shape of tube 11 as the conveyor belt is moved around corners in the conveying apparatus, and as the side walls of the tube are stretched open at the charging and discharging stations.

As best seen in Figures 2 through 4, tubular portion 11 is preferably of integral construction. This not only produces a strong, durable tube but permits the inside walls of the tube to be conveniently formed with a substantially smooth surface. The smooth inner surface of tube 11 renders the tube more efficient in discharge, tends to cause it to remain relatively clean through extended periods of use, and makes any necessary periodic cleansing operation a simple and convenient process.

In the preferred embodiment described in this specification, inner wall 21 of tube 11 presents a substantially smooth surface in all directions. However, the most important direction in which inner surface 21 should present a substantially smooth surface is across the tube from one set of interlocking means 12 at one outer edge 13 of side wall 14 to the other, whether in a squarely transverse direction or at an angle.

Forming tube 11 with an ellipsoid cross section, as shown in Figures 2 and 3, renders charging of the tube a more efficient operation. With the minor axis of the ellipsoid cross section passing in the vicinity of the interlocking means 12, opening the tube for charging as the tube passes around hopper 16 will cause the opened tube at the charging station to take the shape of a receptacle more or less square in cross section. This provides a good balance between a shallow tube which could be most quickly filled from the charging hopper, and a tube of relatively narrow width which could be most quickly opened for charging and closed again after passing the charging station.

Tube 11 is so formed that when interlocking means 12 are opened and the tube is spread out to its full extent, the tube assumes a substantially flat shape. This again makes for efficient discharge and for ease and convenience of cleaning. Integral formation of tubular portion 11 of conveyor belt 10 makes it relatively simple to fabricate the tube so that in its extended position inner surface 21 of the tube assumes the desired flat shape.

*Base member.*—Conveyor belt 10 is provided with flanges 30 extending on both sides of tube 11 for engagement with supporting and guiding devices (not shown) such as rollers in the conveying apparatus with which the belt may be used. Flanges 30 combine to form base member 31, upon which tubular portion 11 is supported as the conveyor belt moves through the conveying apparatus.

Base member 31 may be formed of rubber-covered fabric transmission belting. The fabric may be, for instance, 42 oz. cotton duck, 60 oz. cotton duck, rayon, other synthetic fabric, or any suitable material which provides the necessary flexibility and strength. The strength required will depend upon the length of the movable tubular conveyor belt and the resulting tension which must be placed upon the belt to support it in the portions of the conveying apparatus where the belt is free of supporting and guiding devices. The resulting base member must be relatively stiff so that the conveyor belt will not tend to sag an unsuitable amount when unsupported.

*Spacer element.*—Figures 2, 3 and 4 show how tubular portion 11 is spaced from base member 31 by means of spacer element 32 located between those two members. This spacer element may be of any thickness that will provide sufficient clearance to avoid substantial wedging or packing of foreign material between tube 11 and base member 31, as such material tends not only to put an extra stress upon wall 14 of tube 11 in the area of its attachment to the base member but may also cause bulging in the otherwise flat inner surface of the tube when it is opened up and extended the maximum amount.

Spacer element 32 may be of sufficient thickness that tubular portion 11 is raised above the top of base member 31 by a distance greater than the largest outside dimension of the particles of material which the conveyor belt is designed to carry. Open space 33 is always present between tubular portion 11 and base member 31 whether the tube is closed (as shown in Figure 3) or opened out to a flat position (as shown in Figure 4). Consequently, any material being handled by the conveyor belt which may accidentally fall upon base member 31 and find its way into space 33 can move freely out again from that space, and will not remain wedged between tubular portion 11 and base member 31.

Experience has shown that spacer element 32 performs another important function. If tubular portion 11 were attached directly to the base member 31, the external surface of the tubular portion 11 would merge with the base member along lines running longitudinally of the base member; the tension stresses applied along the outer surface of the tubular portion as teeth 12 are brought toward each other would be concentrated along these lines, which would result in rapid separation of the tubular portion from the base member. In accordance with my invention, spacer element 32 is provided and said stresses are distributed laterally over same, which distributes the forces tending to separate the tubular portion from the base member along or over a substantial portion of the width of the conveyor.

Spacer element 32 may be fabricated as a raised surface on the outside of tubular portion 11. The surface should have a predetermined height depending upon the ultimate spacing desired between tubular portion 11 and base member 31. This is the method of construction used in the embodiment shown in Figures 2 through 4. The spacer element may be reinforced, as shown in Figures 3 and 4, by additional fabric webbing.

On the other hand, if desired, spacer element 32 may be fabricated as a raised surface integrally formed with the transmission belt which comprises base member 31. In this case, the height of the raised surface on base member 31 should again be the same as the predetermined spacing desired between tubular portion 11 and base member 31 in the completed conveyor belt.

The various parts of the conveyor belt of this invention—tube 11, spacer element 32, and base member 31—may be attached by any suitable method. For example, if these elements are rubber or rubber-coated fabric, they may be joined by vulcanizing, by stitching, or any other suitable means.

The above detailed description of this invention is given for clearness of understanding only. No unnecessary limitations should be understood therefrom, as modifications will be obvious to those skilled in the art.

The terms "substantial thickness" and "substantial distance" as used in the appended claims refer to approximately the proportions shown in the drawings.

I claim:

1. A tubular conveyor belt for conveying bulk materials and of the type that is arranged for cooperation with supporting and guiding rollers, comprising an endless ribbon-like base member including longitudinal side edges separated by a center portion, said base member being engaged by the supporting and guiding rollers, an endless flexible tube that is coextensive with and is affixed to said base member, said tube being formed by a one-piece ribbon-like member including longitudinally extending edges separated by a center portion, said tube forming member being formed with zipper-like interlocking teeth along its said longitudinally extending edges and said teeth extending outwardly of said external surface of said tube, whereby when said teeth of said tube forming member are interlocked, said tube is formed, said tube including an internal surface against which the bulk material bears and an external surface, said internal surface of said tube being smooth laterally of said tube between said longitudinally extending edges of said tube forming member, whereby, when said teeth are in interlocking relation, said internal surface is disposed in a smooth and generally rounded configuration transversely of said tube, and a spacer element separating said tube from said base member, said spacer element being coextensive with said base member and said tube, said base member and said tube being secured to said spacer element, said spacer element being of substantial thickness to separate said external surface of said tube and said base member a substantial distance, whereby the internal surface of said tube, when said tube forming member is opened up to ribbon-like condition, presents a smooth surface that is substantially planar in transverse cross section, and whereby, when said teeth of said tube are urged toward each other, tension stresses created in said tube forming member by the bringing together of said longitudinally extending edges of said tube forming member, and tending to separate said tube from said base member, are distributed laterally of said spacer element.

2. The conveyor belt set forth in claim 1 wherein said center portions of said base member and said tube are secured to said spacer element.

References Cited in the file of this patent

UNITED STATES PATENTS

| | | |
|---|---|---|
| 2,212,024 | Johns | Aug. 20, 1940 |
| 2,365,762 | Johns et al. | Dec. 26, 1944 |

FOREIGN PATENTS

| | | |
|---|---|---|
| 729,274 | Germany | Dec. 12, 1942 |
| 834,366 | Germany | Mar. 20, 1952 |